(12) United States Patent
Cukras et al.

(10) Patent No.: US 12,718,368 B2
(45) Date of Patent: Aug. 25, 2026

(54) SYSTEMS AND METHODS TO AUTOMATICALLY DETECT ELLIPSOID ZONE LOSS IN SD-OCT IMAGING

(71) Applicant: The USA, as represented by the Secretary, Department of Health and Human Services, Bethesda, MD (US)

(72) Inventors: Catherine Cukras, Bethesda, MD (US); Wathudurage Tharindu De Silva, Bethesda, MD (US)

(73) Assignee: The United States of America, as represented by the Secretary, Department of Health & Human Services, Bethesda, MD (US)

( * ) Notice: Subject to any disclaimer, the term of this patent is extended or adjusted under 35 U.S.C. 154(b) by 356 days.

(21) Appl. No.: 18/690,130

(22) PCT Filed: Sep. 8, 2022

(86) PCT No.: PCT/US2022/076135
§ 371 (c)(1),
(2) Date: Mar. 7, 2024

(87) PCT Pub. No.: WO2023/039487
PCT Pub. Date: Mar. 16, 2023

(65) Prior Publication Data

US 2024/0428405 A1 Dec. 26, 2024

Related U.S. Application Data

(60) Provisional application No. 63/241,823, filed on Sep. 8, 2021.

(51) Int. Cl.
*G06T 7/00* (2017.01)

(52) U.S. Cl.
CPC .. *G06T 7/0012* (2013.01); *G06T 2207/10101* (2013.01); *G06T 2207/20081* (2013.01);
(Continued)

(58) Field of Classification Search
CPC ......... G06T 7/0012; G06T 2207/10101; G06T 2207/20081; G06T 2207/20084; G06T 2207/30041; G06T 9/002; G06T 5/60; A61B 3/102; A61B 5/0066; A61B 2090/3735; A61B 3/12; A61B 3/1233; A61B 3/1241; A61F 2009/00851; G06N 3/0454; G06N 3/02–126;
(Continued)

(56) References Cited

U.S. PATENT DOCUMENTS

| | | | | |
|---|---|---|---|---|
| 2017/0156582 | A1* | 6/2017 | Ehlers | G16H 50/30 |
| 2019/0279358 | A1* | 9/2019 | Schaal | A61B 3/102 |

(Continued)

OTHER PUBLICATIONS

Pfau, Maximilian, et al. “Progression of photoreceptor degeneration in geographic atrophy secondary to age-related macular degeneration.” JAMA ophthalmology 138.10 (2020): 1026-1034 (Year: 2020).*

(Continued)

*Primary Examiner* — Atiba O Fitzpatrick
(74) *Attorney, Agent, or Firm* — Polsinelli PC

(57) ABSTRACT

Various embodiments for systems and methods for automatically detecting ellipsoid zone loss in SD-OCT imaging are disclosed herein.

12 Claims, 11 Drawing Sheets

(52) U.S. Cl.
CPC ............... *G06T 2207/20084* (2013.01); *G06T 2207/30041* (2013.01)

(58) Field of Classification Search
CPC ............. G06N 20/00–20; G06V 10/87; G06V 30/19113; G06V 10/7753; G06V 10/70; G06V 10/82; G06V 10/774–7796; G06V 10/454; G06K 9/6256; G06K 9/6257; G06K 9/6259; G06F 18/214–2155; G06F 7/023; G06F 40/16; G01N 29/4481
See application file for complete search history.

(56) References Cited

U.S. PATENT DOCUMENTS

| | | | | |
|---|---|---|---|---|
| 2020/0027209 | A1 * | 1/2020 | Madabhushi | G06T 5/20 |
| 2020/0077883 | A1 * | 3/2020 | Ehlers | A61B 3/0025 |
| 2021/0209758 | A1 * | 7/2021 | Buckland | G06T 7/12 |
| 2022/0351376 | A1 * | 11/2022 | Ehlers | G06T 7/0012 |
| 2023/0034053 | A1 * | 2/2023 | Mahajan | A61K 31/215 |
| 2023/0157533 | A1 * | 5/2023 | Chang | G16H 50/30 705/2 |
| 2024/0296555 | A1 * | 9/2024 | Joskowicz | G06T 7/0012 |
| 2025/0217720 | A1 * | 7/2025 | Cheung | G16H 50/20 |

OTHER PUBLICATIONS

International Search Report and Written Opinion, PCT/US2022/076135, 17 pages, Jan. 10, 2023.

De Silva et al, “Deep Learning-Based Automatic Detection of Ellipsoid Zone Loss in Spectral-Domain OCT for Hydroxychloroquine Retinal Toxicity Screening”, American Academy of Opthalmology, vol. 1, No. 4, pp. 1-11, 2021.

Etheridge et al, “A Semi-Automated Machine-learning Based Workflow for Ellipsoid Zone Analysis in Eyes with Macular Edema: SCORE2 Pilot Study”, PLOS ONE, vol. 15, No. 4, pp. 1-12; 2020.

Loo et al., “Deep Longitudinal Transfer Learning-Based Automatic Segmentation of Photoreceptor Ellipsoid Zone Defects on Optical Coherence Tomography Images of Macular telangiectasia Type 2”, BioMedical Optics Espress, vol. 9, No. 6, 2018.

* cited by examiner

RP Performance Validation

Algorithm trained using HCQ patients to detect EZ loss

N patients = 9 Total area (manual) ($A_1$)= 10.52 ± 9.88 $mm^2$

N eyes = 17 Total area (algorithm) ($A_2$) = 9.32 ± 9.55 $mm^2$

N images = 34 Area difference ($|A_1-A_2|$) = 1.20 ± 0.67$mm^2$

HCQ Performance Validation - Cirrus

Algorithm trained using manual ground truth for 13 eyes and tested as follows:

N patients = 18 Total area (manual) ($A_1$)= 16.90 ± 8.58 $mm^2$
N eyes = 27 Total area (algorithm) ($A_2$) = 17.41 ± 7.95 $mm^2$
N images = 27 Area difference ($|A_1-A_2|$) = 1.32 ± 1.26$mm^2$

SYSTEMS AND METHODS TO AUTOMATICALLY DETECT ELLIPSOID ZONE LOSS IN SD-OCT IMAGING

FIELD

The present disclosure generally relates a method of automatically detecting ellipsoid zone loss in SD-OCT imaging; and in particular, to a systems and methods for deep-learning based automatic detection of ellipsoid zone loss in SD-OCT for hydroxychloroquine retinal toxicity or retinitis pigmentosa screening.

BACKGROUND

Hydroxychloroquine (HCQ) is a widely used drug to treat autoimmune diseases such as systemic lupus erythematosus, Sjogren's syndrome, and rheumatoid arthritis. One of the major known side-effects among long-term users of the drug is retinal toxicity that can result in permanent damage to photoreceptors and retinal pigment epithelium (RPE) eventually leading to irrecoverable central vision loss. While this side-effect is estimated at 7.5% of patients on the drug for >10 years, there is currently no treatment and the damage tends to continue even after the cessation of the drug making screening essential. The American Academy of Ophthalmology (AAO) recommends two main screening modalities including spectral domain optical coherence tomography (SD-OCT) imaging and functional tests such as visual fields with the goal of recognizing early definitive signs of toxicity to prevent vision loss. SD-OCT imaging allows for the evaluation of the retinal layers including outer retina and plays a vital role in screening for evidence of the structural changes induced by drug toxicity. Detection of the ellipsoid zone (EZ) band, and any associated EZ loss has been proposed as outcome measures of disease progression in several degenerative diseases as it indicates the deterioration of photoreceptors. EZ loss area from enface maps of eyes with HCQ toxicity has also been shown to correlate with mean deviation of visual function.

Although SD-OCT is considered to be an objective modality depicting structural changes, the current clinical use in HCQ screening employs qualitative inspection of individual OCT B-scans to identify areas of localized photoreceptor thinning and EZ loss (interruption or discontinuity of the EZ) which represents and denotes definitive evidence of retinal toxicity. While classical presentation of apparent toxicity is described as bilateral bull's eye maculopathy where the retinal layers have degenerated in the shape of a parafoveal ring sparing a foveal island early stage disruptions in EZ, can be subtle and miniscule. Variable degrees of severity present in SD-OCT, suboptimal image quality, and interpretation of images with different levels of clinical-expertise (screening performed by retinal specialists, ophthalmologists, and in some settings optometrists) can induce subjectivity, variability, and error to current diagnostics. A fully automatic method to detect and quantify loss of the EZ band from SD-OCT imaging would thus add an objective, precise, and time-efficient assistance to the current screening for toxicity. It can assist the clinician with the visualization of topographical distribution of EZ loss as well as quantitative metrics such as: total area of EZ loss, percentage EZ loss in ETDRS subfields, and the extent of foveal involvement to improve the accuracy and objectivity of the diagnosis.

The goal of automated EZ loss detection presents several challenges. While multiple previous works have developed algorithms for retinal layer segmentation in SD-OCT deriving surrogate metrics related to EZ loss from the contouring of retinal layers, segmentation often fails in the presence of disease, thereby requiring significant manual adjustments to the algorithm-generated contours. When the layers are deteriorating, robustly annotating the entire retinal layer to define ground truth can be both time consuming and challenging. The integrity of the layer segmentation would be compromised in regions with subtle loss having fading levels of image intensity without any signs of frank loss.

It is with these observations in mind, among others, that various aspects of the present disclosure were conceived and developed.

SUMMARY

The system for automatically detecting EZ loss in imaging includes a processor in operative communication with a memory, wherein the memory includes instructions and wherein the instructions which, when executed, cause the processor to obtain a plurality of B-scans from a spectral domain optical coherence tomography (SD-OCT) volume; apply an algorithm by the processor for performing scan-by-scan ellipsoid zone (EZ) loss detections on each B-scan of the plurality of B-scans; and implement a dual-path convolutional neural network combining horizontal and vertical EZ loss projections to predict EZ loss, wherein performing EZ loss detection includes automatically generating an EZ loss segment for each of the plurality of B-scans and wherein EZ loss occurs in retinal diseases. In some embodiments, the retinal diseases may include hydroxychloroquine-induced retinal toxicity or retinitis pigmentosa. In addition, the system may further include projecting scan-by-scan EZ loss detections onto an enface EZ loss map to estimate a two-dimensional (2D) enface EZ loss projection representing regions of EZ loss in the SD-OCT volume, wherein estimating the 2D enface EZ loss projection includes applying a dual path neural network that generates a horizontal 2D EZ loss projection and a vertical 2D EZ loss projection, wherein the horizontal 2D EZ loss projection is based on horizontally sampled scans obtained from the SD-OCT volume and the vertical 2D EZ loss projection is based on vertically sampled scans obtained from the SD-OCT volume. Further, the system may also include raining in parallel a horizontal neural network of the dual path network and a vertical neural network of the dual path network such that the horizontal neural network is trained using the horizontally sampled scans aligned along a horizontal orientation and the vertical neural network is trained using the vertically sampled scans aligned along a vertical orientation of the SD-OCT volume. In one aspect, the trained horizontal neural network generates a horizontal 2D EZ loss projection and the trained vertical neural network generates a vertical 2D EZ loss projection, wherein the horizontal 2D EZ loss projection and the vertical 2D EZ loss projection are combined using a combined projection network (CPN) to generate the enface EZ loss map and wherein the CPN generates an estimate for the presence of EZ loss at each location in the enface EZ loss map.

In another aspect, a method for automatically detecting EZ loss in imaging may include obtaining a plurality of horizontally sampled scans and a plurality of vertically sampled scans from an SD-OCT volume, training in parallel a horizontal neural network and a vertical neural network such that the horizontal neural network is trained using the plurality of horizontally sampled scans aligned along a horizontal orientation and the vertical neural network is trained using the plurality of vertically sampled scans aligned along a vertical orientation of the SD-OCT volume, generating a horizontal 2D EZ loss projection by the horizontal neural network and a vertical 2D EZ loss projection by the vertical neural network, and combining the horizontal 2D EZ loss projection and the vertical 2D EZ loss projection using a combined projection network (CPN) to generate an enface EZ loss map, wherein the CPN generates an estimate for the presence of EZ loss at each location in the enface EZ loss map

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
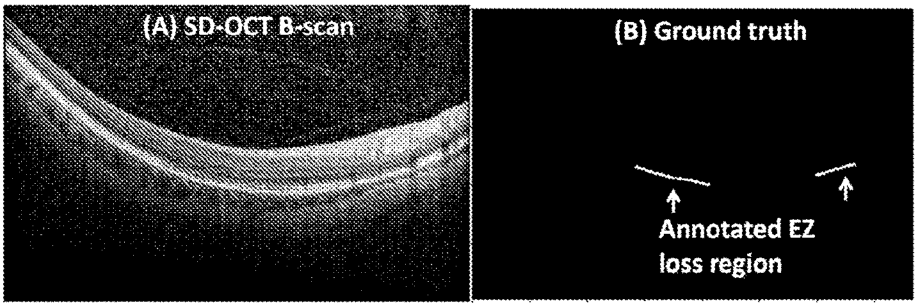
FIG. 1 shows a scan-by-scan EZ loss detection and segmentation using mask-RCNN network.
Figure 1:
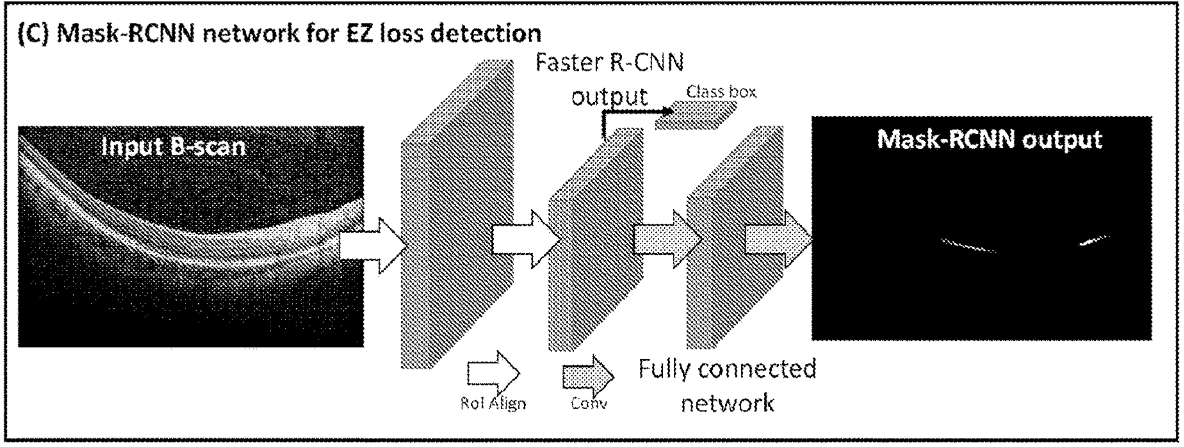

To overcome these obstacles, the present system and method detects and outlines the region of loss directly without relying on an entire layer segmentation. The present method was developed using the limited number of disease-positive training images due to the disease affecting a minority of the patient population. For learning based methods, annotated training data is costly and time-consuming and therefore methods accommodating minimal training data are desired. To address these challenges, the present system and method includes a deep-learning framework with a two-step approach. First, the present system implements a method to detect and annotate EZ loss regions in individual OCT B-scans. The present system then constructs an EZ loss map by aggregating scan-by-scan EZ detections onto an enface 2D projection. To enhance robustness, 2D projection was constructed twice in a dual architecture where horizontal and vertical slices extracted from the 3D image are trained separately. The second step of the model operates on the two 2D projection images obtained from horizontal and vertical scans and estimates the final enface EZ loss map. Alternatively, EZ loss regions can be segmented with direct pixel labelling using a semantic segmentation method. Since the pixels depicting EZ loss vastly outnumber pixels without loss in the training data set, this would lead to a challenging class imbalance problem. Therefore, first detecting areas with loss and limiting the pixel labelling to more probable instances with loss would be a more efficient approach in terms of learning.

Automatic method for EZ loss detection in SD-OCT imaging disclosed in the present system and method was validated using image data from a single center case-control clinical study with participants who were long term users of HCQ. The present system demonstrated that the algorithm executed by a processor can accurately detect and quantify EZ loss in this data set which includes patients who did not exhibit any signs of toxicity, those with subtle, mild cases with minimal functional loss, and those with severe toxicity with significant functional loss. The present disclosure examines the ability of automatically derived quantitative metrics to facilitate the screening process by making toxicity determinations in an objective manner. Finally, the present system explores the relationship of the measured EZ loss area and functional measurements such as visual field mean deviation and visual acuity where EZ loss maps could provide useful insights to the visual function deficiencies arising from toxicity.

Methods

Participants

Data was collected as part of an institutional review board (IRB)-approved clinical study (also registered at www.clinicaltrials.gov NCT01145196) from patients who were long term (>5 years) users of HCQ. Written informed consent was obtained from all participants and the study protocols adhered to the tenets of the Declaration of Helsinki and the Health Insurance Portability and Accountability Act. 85 participants with a mean age 59±12 years, 93% female who were exposed to HCQ for a mean of 14±7.2 years were included in the analysis. Patients underwent a comprehensive ocular examination including AAO 2016 revised screening tests: multi-modal imaging, multifocal electroretinogram (mfERG) testing, and perimetry testing. During study visits SD-OCT images were acquired using Heidelberg Spectralis HRA+OCT system (Heidelberg Engineering Inc, Heidelberg, Germany) following two scan protocols. The first consisted of a single horizontal 30° scan (768×496) through the fovea with 100 frame averaging. The second was a volumetric macular cube scan (voxel dimensions=768×496×121, voxel spacing=11.9 μm×3.9 μm×64.0 μm) spanning 30° horizontally and 20° vertically. The images exhibited variable image quality representative of practical clinical settings acquired during a period of 5+ years. The signal to noise ratio (SNR) as measured by the vendor device exhibited a range 17.8-31.1 dB with SNR (mean±stdev)=26.7±2.7 dB. The scanning protocol was set with frame averaging=2 in 98.5% percent of the B-scans. The remainder had frame averaging ranging from 5-25. The study data set included both eyes of each participant except for 2 eyes that were excluded due to unavailable/suboptimal quality OCT scans leaving 168 eyes available for analysis.

Determination of toxicity: Toxicity was determined based on the AAO recommendations including the findings from a combination of objective (SD-OCT or mfERG) and subjective (Humprey visual field) testing. Evidence for toxicity in visual field tests was defined as having either 3 contiguous abnormal points on the pattern deviation map or a full ring scotoma. Horizontal SD-OCT foveal B-scans were inspected for evidence of EZ loss. In mfERG, reduced central amplitude (<35 nV/deg2) or abnormal ring ratio (>2.6) were used as criteria for evidence of toxicity. 55 subjects (110 eyes) were classified as unaffected (i.e., without toxicity) whereas 30 subjects (58 eyes) were identified as affected having toxicity. For details on toxicity determinations see Supplementary Table 1.

Automatic Algorithm for EZ Loss Detection 42 eyes (21 patients) of the 30 affected subjects, exhibited significant EZ loss, defined as ≥100 μm loss in the foveal SD-OCT scan. Two trained human experts, with verification by a retina specialist, manually annotated regions of EZ loss in the 5082 horizontal scans of the 21 eyes producing 3477 B-scans with contours of EZ loss and 1605 horizontal scans without evidence of EZ loss. EZ loss was defined as complete absence of the EZ band, such that areas of EZ band attenuation without complete absence (as occurs in some cases of early severity, adjacent to areas of frank disruption, or as occurs in shadowing under large retina vessels) did not qualify. In addition, 33,432 vertical scans were interpolated from the volume scans and ground truth vertical annotations were automatically derived via interpolation of manually-defined horizontal annotations. The human expert annotation of regions with EZ loss is considered the gold standard for the automatic algorithm training and evaluation and henceforth referred to as ground truth. These ground truth annotations were provided as input to the deep learning algorithm.

A two-step strategy was devised to generate an enface EZ loss map for each volumetric SD-OCT scan. The first step consisted of an algorithm for scan-by-scan EZ loss detection independently in each B-scan from the SD-OCT volume. The present system implemented a mask region based convolutional neural network (M-RCNN) network to predict the EZ loss using manually annotated SD-OCT B-scans capturing EZ loss as shown in FIG. 1. Resnet-50 was used as the backbone for feature selection with 256 hidden layers. Pre-trained weights (trained on the COCO data set with natural images) was used to initialize the model. The network was trained optimizing for multi-task losses for box detection, classification, and mask labelling. To provide ground truth for the detection task, boxes were generated encapsulating each manually defined EZ loss segment. The encapsulating boxes had a range of sizes and aspect ratios depending on the extent of EZ loss and the slope of EZ layer within the B-scan. The classification in this instance is a binary task where the presence of EZ loss versus no loss was determined for each box proposal. Stochastic gradient descent optimizer was used with a learning rate=0.0005, momentum=0.9, and weight decay=0.0005. These hyperparameters including scale (5 values between 32-512) and aspect ratios (0.5, 1, and 2) were set empirically without using an explicit validation set. In each fold, training was performed for 20 epochs with random generation of training data samples until the error measured in the training set converged. The network was implemented in PyTorch v1.6. For an input B-scan, the network predicts and annotates the corresponding region of EZ loss as shown in FIG. 1.

Figure 2:
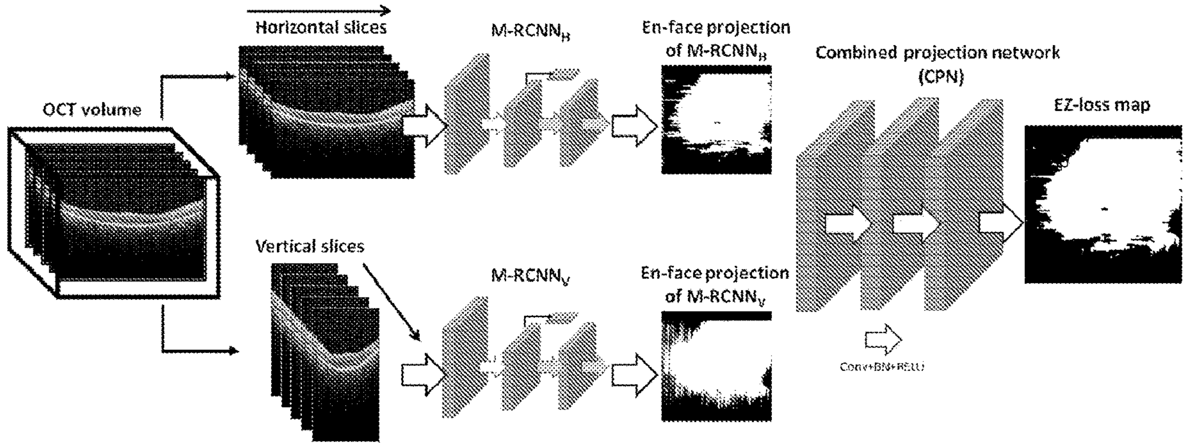
FIG. 2 shows the combined projection network predicting enface EZ loss map by aggregating scan-by-scan detections in horizontal (M-$RCNN_H$) and vertical networks (M-$RCNN_V$).

In the second step, scan-by-scan detections were projected onto an enface image to generate a 2D projection representing the regions of EZ loss in the 3D OCT volume. To improve the accuracy and robustness of estimating the enface EZ loss map, two-fold additions to the overall network architecture were devised as shown in FIG. 2. First addition is by way of redundancy where a dual path network generates two EZ loss maps using horizontal and vertical scans extracted from the same 3D OCT volume training two independent networks in parallel in horizontal ($M\text{-}RCNN_H$) and vertical ($M\text{-}RCNN_V$) directions as shown in FIG. 2. The second add-on to the network is an aggregation network that operates on horizontally and vertically derived dual-projection images combining the outputs of $M\text{-}RCNN_H$ and $M\text{-}RCNN_V$ mitigating any inconsistencies arising from independent scan-by-scan detections. The output of this combined projection network (CPN) makes the final consensus estimate for the presence of EZ loss at each location in the enface map. This approach could be more robust since it can identify any spatially inconsistent patterns of spurious detections across parallel scan-by-scan detections. The CPN was a custom network implementation of three convolution layers each matching the dimensions of the EZ loss map (768×768) without any down-sampling or up-sampling. Relu and MaxPool operations were applied at the end of the first two convolutional layers. The output of the third convolutional layer was derived directly as the EZ loss map. This provides a regression output and a thresholding operation was used to obtain the final binary EZ loss map. This network was trained with mean squared error loss using stochastic gradient descent optimizer with learning rate=0.001 and momentum=0.9. The training was performed for 10 fixed number of epochs until the training error converged.

Experiments

The deep learning model was developed using images from 42 eyes with 90% of the data used for training while testing with the remaining 10 percent. The model with two-steps were trained serially where the first stage of the network was trained using individual B-scans and the second stage of the network was trained after freezing all the weights of the first stage of the network and using all the B-scans from a volume. In both stages, individual scans from the same patient were not included in both training and test sets simultaneously to mitigate possible bias during learning. Ten-fold cross validation was performed and the accuracy of detecting EZ loss in enface 2D maps was quantified using precision (positive predictive value) (TP/(TP+FP)), recall (sensitivity) (TP/(TP+FN)), intersection over union (IOU) (TP/(TP+FP+FN)) and F1-score (Dice) ((2*precision*recall)/(precision+recall)) metrics. To compare performance with a retinal layer segmentation-based method, a previously published deep learning model was used to generate pixel labels for retinal layers. The model was trained using labelled data from AMD patients and the layer thickness was set to zero in regions with loss to accurately compute EZ loss. The model (DLabv3) comprised of a convolutional neural network Deeplabv3 with a ResNet50 backbone (the same feature selection backbone used in the present system) and operated independently on individual B-scans. All pixels were labelled into 7 different classes (inner retina, outer nuclear layer, inner segments, outer segments, RPEDC, choroid and background) as described in Pfau et al. The presence of the boundary between inner and outer segments was defined as EZ presence and regions without this boundary was identified as EZ loss. Enface EZ loss maps were generated by projecting the presence/absence of EZ loss along each A-scan.

Annotating EZ loss by human experts could be subjective in some scenarios where EZ layer is deteriorated but not completely lost. This variability was measured in a separate experiment by repeatedly annotating a subset of 7 OCT volumes (847 B-scans) by the two human experts independently to provide quantification for the human grader variation.

After training and testing the model on the cohort of 21 eyes with definitive signs of toxicity, the present system generated enface EZ loss maps for all the participants in the study including unaffected eyes and the eyes with the mild findings (<100 μm EZ loss in foveal slice). The verification of the absence of EZ loss on enface maps of unaffected patients not included in the development of the algorithm, would test its validity to operate on the entire patient population, of which the majority do not show any sign of EZ loss. The system was evaluated on how a quantitative metric derived from the EZ loss map (i.e., total EZ loss area measured within a 6 mm diameter from fovea) correlated with other functional tests.

Results

Accuracy Validation of Enface EZ Loss Map Generation

Figure 3:
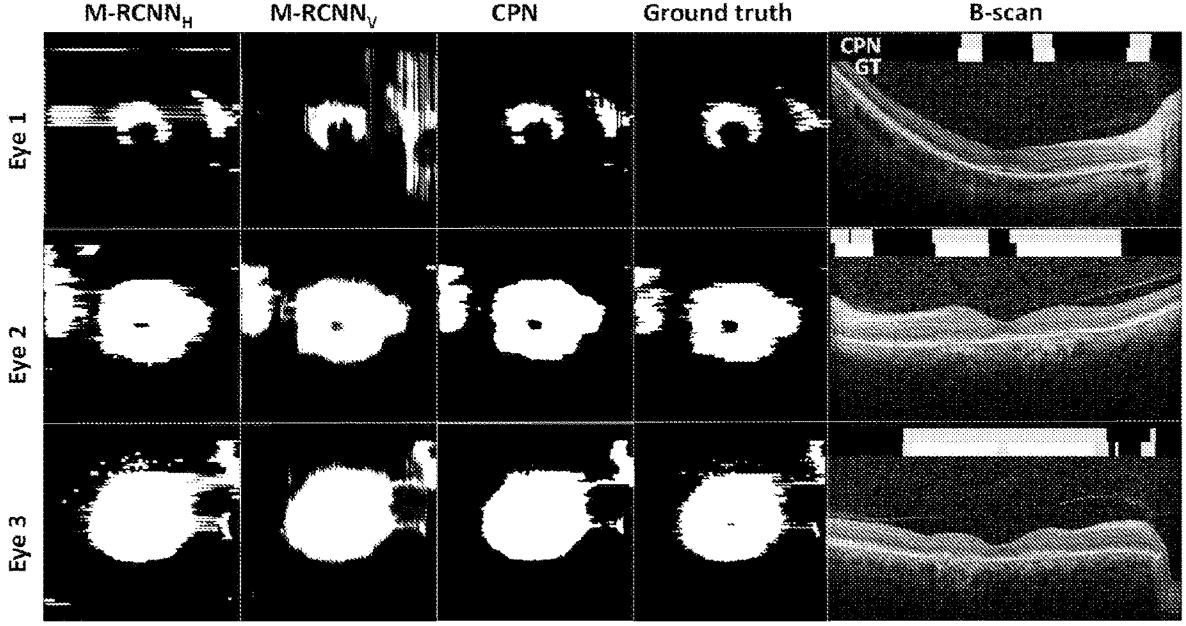
FIG. 3 shows enface EZ loss maps generated from different models evaluated in the present disclosure. Each row is a different eye representative of clinical images used in the study. The right column shows the performance of the algorithm in B-scans where cyan represents the algorithm output and yellow denotes the ground truth annotation for that B-scan.

FIG. 3 shows enface EZ loss maps generated from different models with a range of EZ loss areas. In slice-by-slice detections in horizontal and vertical networks, EZ loss projection contained non-smooth regions with horizontal and vertical streaking artifacts due to the lack of spatial consistency between slices. Ground truth projections also exhibited this artifact since the manually annotated EZ loss endpoints did not perfectly line up across adjacent B-scans. Overall, the combined projection network predicted output maps better resembling the ground truth, successfully mitigating some spurious detections inconsistent across horizontal and vertical maps. The streaking artifacts in horizontal and vertical networks were also mitigated producing a more regularized output for EZ loss regions.

Figure 4:
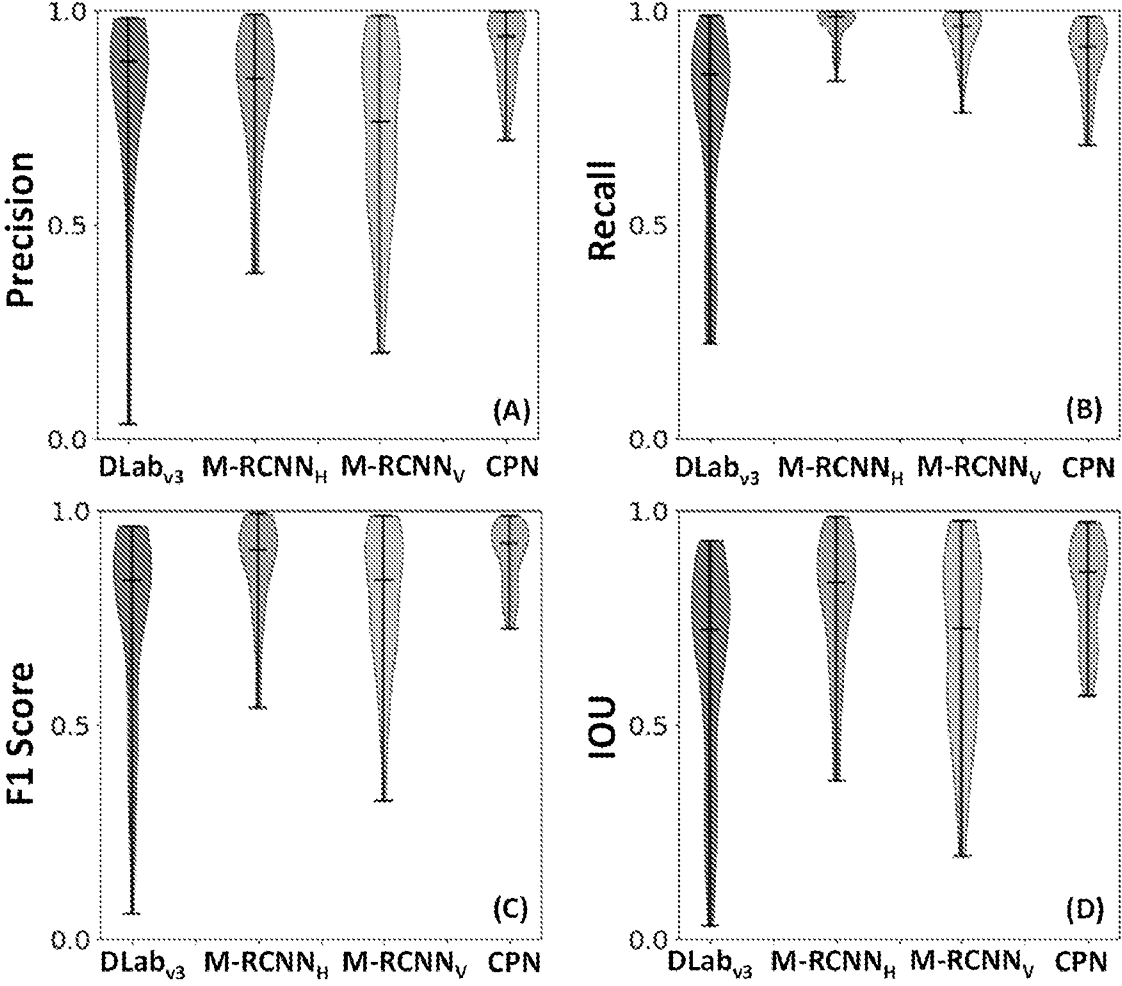
FIG. 4 shows violin plots comparing the precision, recall, intersection over union, and F1-score distributions of the different models evaluated in this work.

FIG. 4 compares the performance of the deep learning models evaluated in this study compared to the ground truth provided by manual contouring. DLabv3 model exhibited performance with precision (mean±std) 0.79±0.21, recall=0.72±0.23, IOU=0.64±0.25, and F1 score=0.74±0.23. This model was trained in patients with different levels of AMD severities that include instances of EZ layer deterioration and indicated the ability to successfully detect EZ loss in HCQ patients. This serves as baseline for comparing the performance of the proposed detection-based models. M-RCNN$_H$ operating on horizontal slices achieved a precision=0.79±0.17, recall=0.96±0.04, IOU=0.78±0.15, and F1 score=0.86±0.12. The second CNN, M-RCNN$_V$ demonstrated slightly inferior performance with precision=0.71±0.21, recall=0.94±0.06, IOU=0.69±0.21, and F1 score=0.79±0.16. This decrease in performance of M-RCNN$_V$ can be attributed to the suboptimal image quality of synthetic (i.e., reconstructed) vertical B-scans extracted from horizontally acquired OCT volume. Average precision for the box detection task at 0.5 IOU in the test set was 49.6% and 33.5% for the M-RCNN$_H$ and M-RCNN$_V$ networks respectively. The combined model, CPN, demonstrated significantly better performance than either M-RCNN$_H$ or M-RCNN$_V$ with precision=0.90±0.09, recall=0.88±0.08, IOU=0.82±0.12, and F1 score=0.89±0.07, (paired t-test p value<0.001 compared to M-RCNN$_H$) confirming the hypothesis that combining horizontal and vertical detections improves the robustness of enface EZ loss estimation. Overall, the models yielded superior recall compared to precision indicating a smaller false negative rate compared to the false positive rate.

Figures 5A, 5B:
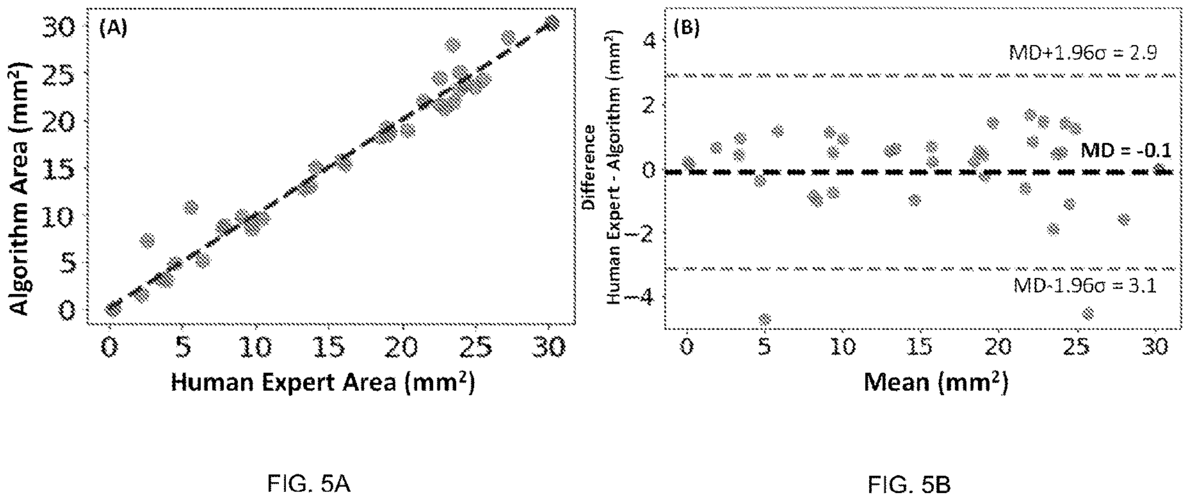
FIG. 5A shows the correlation of human annotated and algorithm generated EZ loss areas and FIG. 5B shows a Bland-Altman plot showing the limits of agreement between algorithm generated and human-expert generated annotations.

The data set contained a cohort of patients with a range of toxicities and therefore a variable range of EZ loss with some moderate toxicity eyes exhibiting small areas of EZ loss in a partial arc around the fovea (FIG. 3, top), and some others at late stages with EZ deterioration visible in a large circular area of EZ loss encompassing most of the macula (FIG. 3, bottom two rows). According to manual annotations, the area of EZ loss measured within a 6 mm diameter from fovea in the images was 16.6±9.1 mm$^2$ (mean±std) and ranged between 0.1-30.2 mm$^2$. The accuracy in predicting the area of EZ loss in the image using the combined projection network was 1.1±1.5 mm$^2$. FIG. 5A shows the comparison of human expert EZ loss against the algorithm estimated EZ loss with excellent correlation (R2=0.98) with error in estimating loss remaining fairly unchanged as a function of EZ loss area. Bland-Altman plot (FIG. 5B) indicated a slight overestimation of the EZ loss area with 95% limits of agreement ranging between −3.1-2.9 mm$^2$. Thus, the network could accurately predict EZ deterioration in a variable range, which could be useful in classifying the disease severity of the patients and integrating to the clinical decision-making process.

Figures 6A, 6B:
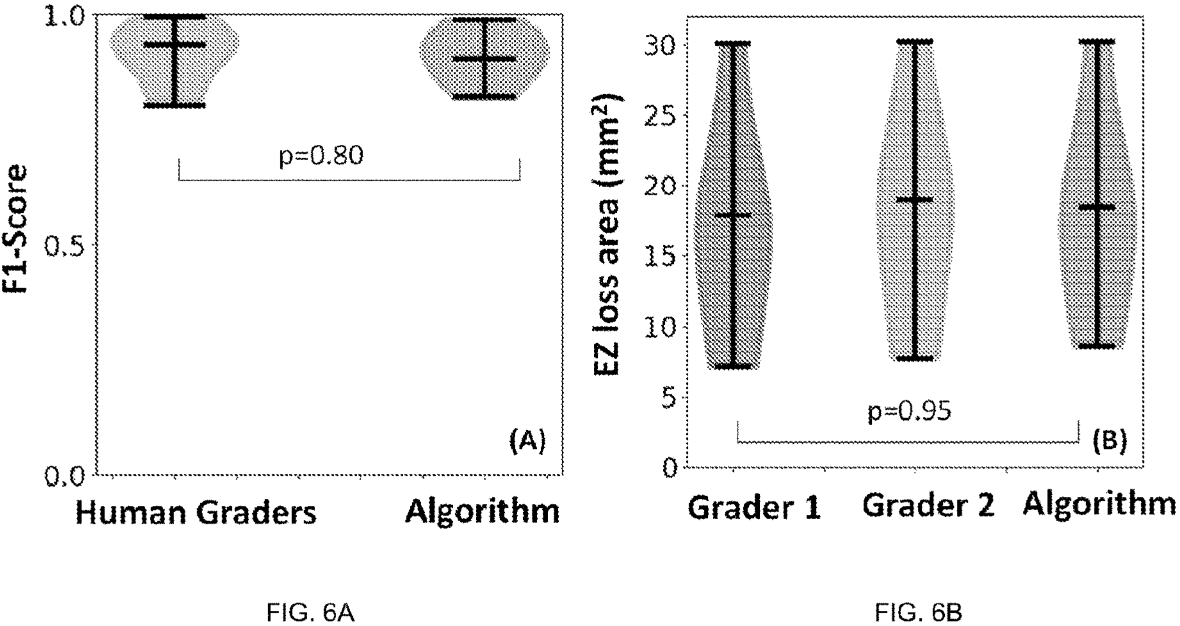
FIG. 6A shows a comparison of the variability of human graders to the error of the algorithm using violin plots showing the F1-score of the grader compared to the algorithm and FIG. 6B shows the comparison of EZ loss area measurements among the two graders and the algorithm.

While the ground truth of manual contouring is the existing gold standard for EZ loss determination, there is variability among human experts in annotating the precise borders of the regions of EZ loss. A subset of 7 OCT cube scans independently graded by 2 graders allowed the quantification of variability between graders which produced a precision=0.85±0.09, recall=0.98±0.01, and F1 score=0.91±0.06 (paired t-test p value=0.80 indicating no statistically significant difference). In this subset the measured areas between graders had error=1.1±0.8 mm$^2$ and the one-way ANOVA test failed to find the statistical significance (p=0.95) among the area measurements computed with two expert grader annotations and the algorithm as shown in FIG. 6B. The variability of human expert annotations was a fundamental limitation to the optimal accuracy attainable with a learning-based model and contextualizes the performance of CPN in the experiments which approached the variability of human experts.

Enface EZ Loss Maps for Clinical Screening

Figure 7:
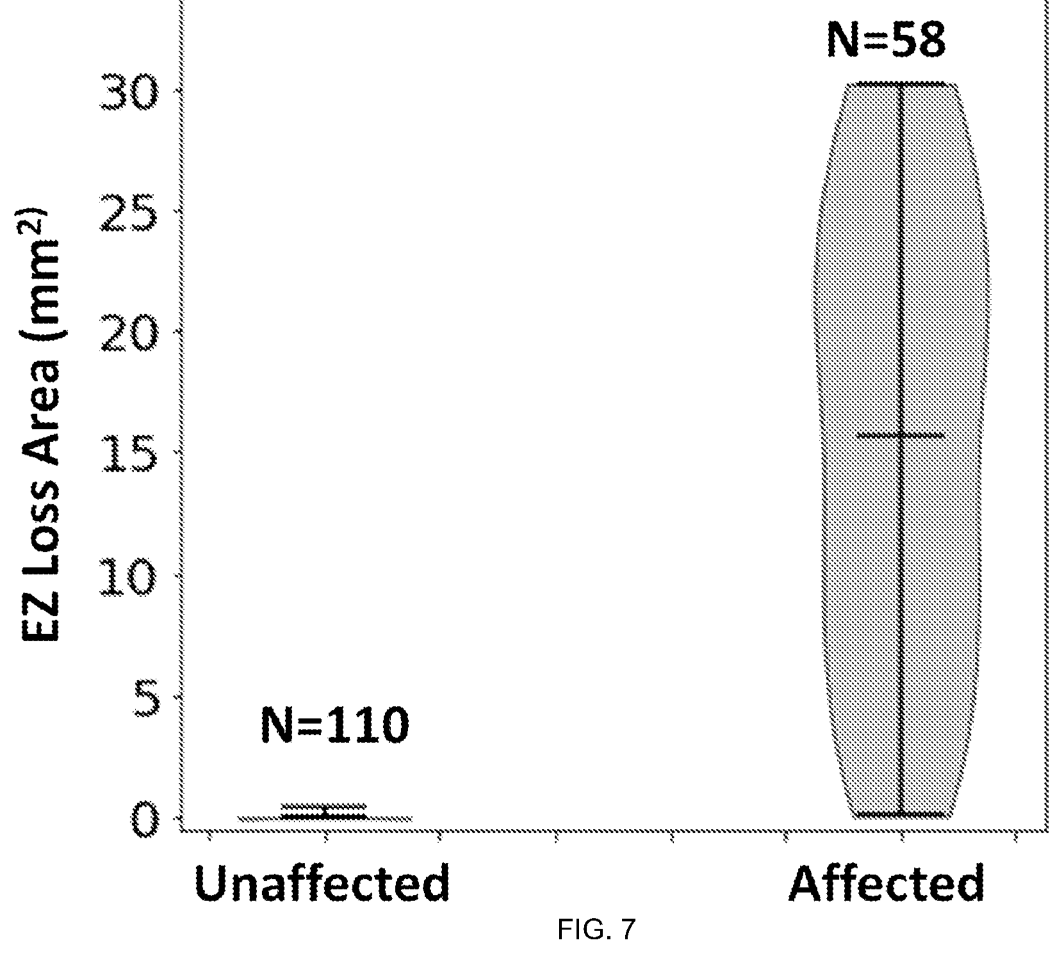
FIG. 7 shows EZ loss area distributions for affected and unaffected groups detected with the automatic algorithm.

While the model was developed using a subset of patients in the study with significant EZ loss (eyes with >100 μm EZ loss in the foveal SD-OCT slice), the entire set of eyes was used to assess the utility of the automatic EZ loss detection algorithm in assisting clinical screening for toxicity. For all study participants the toxicity was determined based on a combination of evidence as demonstrated in one objective test (SD-OCT or mfERG criteria) and one subjective test (visual field). Based on the AAO recommended clinical determination of toxicity, 58 eyes of the 158 eyes were affected whereas 110 were classified as unaffected. FIG. 7 compares the total EZ loss area distributions measured in affected and unaffected groups. The algorithm did not identify substantial EZ loss regions (EZ loss area mean±stdev=0.01±0.07 mm$^2$) in the 110 unaffected eyes, validating our model in successfully confirming the absence of EZ loss in this group of patients. Inspection of the 8/110 cases that exhibited non-zero EZ loss area (0.1-0.5 $mm^2$) revealed regions with fading of the EZ layer without complete loss arising from shadowing or peripapillary atrophy. The algorithm detected clear signs of EZ loss areas (mean±stdev=15.71±9.49 $mm^2$) in eyes with toxicity. 16 of the 58 eyes with toxicity had minimal (0←100 um EZ loss) in the foveal B scan and were not part of the model development. However, in these 16 eyes the model did detect evidence of EZ loss in 7 eyes (0.1-3.9 $mm^2$) and did not detect evidence of EZ loss in the remaining 9 eyes.

AUC of differentiating between unaffected and affected groups (determined using AAO screening recommendations) using the EZ loss area as a metric was found to be 0.91. With an optimal threshold at EZ area=0.007 $mm^2$, this corresponded to a classification accuracy=89.9% (151/168) with a false positive rate=7.3% (8/110) and a false negative rate=15.5% (9/58). All the false negatives were triggered due to eyes that were clinically determined to have toxicity but for which the algorithm did not detect EZ loss. The human grader qualitative inspection also revealed no apparent EZ loss in these images confirming the accuracy of the algorithm. These patients were identified as affected due to the positive visual field findings and mfERG results demonstrating the complexities of toxicity determination in certain cases. Overall, the algorithm detected all cases of definitive toxicity with EZ disruption even those with very small areas of EZ loss. Thus, EZ loss regions detected by the algorithm combined with other functional testing provides an automatic, fast, robust method to improve the efficacy of clinical screening.

EZ Loss Correlations with Visual Function

Figures 8A, 8B:
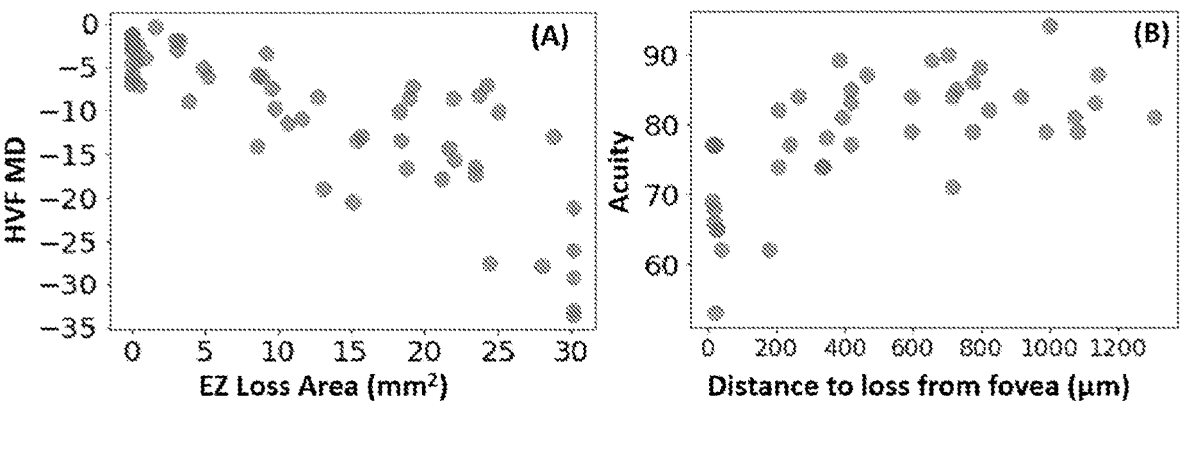
FIG. 8A shows the relationship between EZ loss area and Humphrey visual field mean deviation and FIG. 8B shows Visual Acuity as a function of closest distance to EZ loss from the fovea.

In addition to facilitating clinical screening for toxicity, automatically generated EZ loss maps could help investigate the relationship between structure and function. To illustrate such potential applications of the algorithm, we analyzed the relationship between total EZ loss area and the mean deviation on the 10-2 Humphrey visual field. FIG. 8A demonstrates a strong negative correlation (R2=−0.81) in the relationship between EZ loss area (measured using the algorithm) and Humphrey visual field mean deviation (HVF MD) indicating worsening function with larger EZ loss. Additionally, analysis demonstrates that the visual acuity is impacted when the EZ loss occurs close (within 0.2 mm) to the fovea (FIG. 8B). Thus, automatic tools for EZ loss generation provides a useful tool in the exploration of structural changes underpinning visual function and the utility would be even greater in large scale studies where manual annotation and inspection is infeasible.

Discussion

The present disclosure discloses an automatic learning-based model to estimate EZ loss in patients at risk of retinal toxicity arising from long-term HCQ use. Mask-RCNN network with transfer learning from natural images successfully identified regions of EZ loss in individual B-scans. Scan-by-scan detections were aggregated to construct an EZ loss map representing the complete loss for the eye. The accuracy and robustness of the EZ loss map were improved by implementing a dual architecture that operates in a redundant manner on horizontal and vertical B-scans from the same image and then aggregates the dual EZ loss maps with an additional set of convolution layers. Even though both horizontal and vertical B-scans contain the same imaging data, multiple detections at same locations were devised as a fail-safe strategy to provide enhanced robustness. This would be analogous to a human observing an object in multiple angles to confirm a hypothesis. Suboptimal performance was observed in the vertical scans, since those are synthetically reconstructed from horizontally acquired data. Any untracked motion between adjacent horizontal scan would create artifacts in synthetically derived vertical B-scans making the detection of EZ loss more challenging to the algorithm. The combined network outperformed the EZ loss map from individual networks improving the overall robustness of the method. The two-stage network efficiently learned an accurate model using the limited number of training examples available in our data set. At the first stage, 2D network could benefit from a robust, powerful 2D network architecture and a larger number of training samples available from the B-scans. The determination of the EZ loss per volume at the second stage aggregating the output from already trained 2D slice detections was efficient compared to using a memory-intensive 3D network architecture. The algorithm successfully detected EZ loss in variable levels of SNR present in acquired images and did not exhibit any degradation of performance within the SNR range 17.8-31.1 dB.

The present system for detecting areas of EZ loss via instance segmentation (object detection followed by pixel segmentation) is algorithmically different from obtaining EZ loss after direct pixel labelling of retinal layers. While both the approaches are capable of yielding pixelwise segmentations of areas corresponding to EZ loss and producing enface EZ loss maps, detection-based segmentation was observed yielding superior performance in the experiments. Instance detection prior to segmentation (instance-first strategy in Mask RCNN) can be advantageous in first selecting candidate regions with probable loss prior to labelling specific pixels depicting layer deterioration. In contrast, layer segmentation methods attempt to assign a label to all pixels in a B-Scan where the majority do not exhibit EZ loss, and most of the pixels do not pertain to the EZ layer. When directly segmenting regions with EZ loss, this could lead to a challenging class imbalance problem where the number of negative pixels vastly outnumber the number of positive pixels in the data set. Thus, instance first strategy could be more efficient in learning with limited data. While the results of applying a retinal layer segmentation demonstrated the potential to successfully identify areas of EZ loss, the measured performance was inferior to detection-based segmentation (FIG. 4), at least without significant retraining using images of HCQ patients. Furthermore, detection-based methods in principle can separate between different instances of the class (i.e., multiple instance of EZ loss) whereas the layer segmentation does not differentiate between multiple instances directly in its output. This additional feature was not utilized since the objective was to quantify the entire region of EZ loss in any given eye.

The disclosed algorithm operable for automatic EZ loss detection could facilitate screening for retinal toxicity with the ability to quantify structural alterations in an objective, time efficient and cost-effective manner. The patients in this case-control study exhibited a wide range of severities of EZ deterioration and the deep learning algorithm successfully detected and quantified EZ loss areas over a considerable range. The enface EZ loss map can provide both quantitative and qualitative insights such as the total EZ loss area, central fovea involvement, and topographical distribution of EZ loss. Toxicity determination based on EZ loss in SD-OCT corroborated determinations of toxicity based on AAO recommended screening guidelines except in a few borderline cases. While conspicuous EZ loss is an important criterion in determining toxicity according to current understanding, multiple other metrics including OCT metrics such as retinal layer thickness and intensity-based measurements could augment multiple criteria to reliably detect toxicity. EZ attenuation without conspicuous loss could also provide evidence for early stage changes. In preliminary attempts, the reliable manual annotation of attenuated EZ loss was found to be highly variable and subjective and thus such examples were not included (mostly in patients with <100 μm EZ loss)) in the training data set. The additional metrics derived from SD-OCT could be combined with the evidence from other functional tests (i.e., visual fields, mfERG) to make the final toxicity determination for the patient per AAO guidelines or used alone when necessary in cases where reliable functional testing is infeasible. As the screening recommendations call for annual screening, this may help alleviate the need for clinical functional testing in some cases, especially where time, patient ability, or other obstacles to testing occur.

Subtleties/complexities exist in determination of toxicity during early stages when multiple screening modalities convey discordant evidence and debate remains as to which screening test—visual field testing, spectral domain OCT, or mfERG—might be the most accurate and sensitive in detecting the earliest evidence of retinal damage. In the data set, there was a small number of patients (9/168) where ancillary testing indicated toxicity even though the OCT scan did not demonstrate any evidence of measurable EZ loss. While ongoing research and studies (some involving longitudinal monitoring of patients) may reveal additional insights into the pathophysiological sequence of events, objective, quantifiable SD-OCT derived metrics can identify instances of early disease with detection of very small areas of EZ loss. Thus, the automatic method to EZ loss detection disclosed herein provides an efficient, objective, quantitative method which will be incorporated into ongoing work that aims to refine criteria to detect toxicity both accurately and at the earliest onset.

While the OCT scan protocol in the present disclosure covered a region of 8.9×7.4 $mm^2$ (30°×25°), even wider OCT scanning protocols can have advantages, especially in Asian patients. In the future, the algorithm developed herein could be retrained and updated with additional examples to successfully detect EZ loss accounting for different OCT scanning protocols. Additionally, the study was limited by a single center study sample and images acquired by a single vendor machine. Due to the ten-fold cross validation strategy where images of test patients were not biased by the training patients' images, the reported performance reflects the accuracy attainable in a single vendor setting with a limited data set. These results warrant further investigation to assess the performance in multi-vendor/multi-center settings. The present system could be easily translated to these settings and could benefit from ground truth from additional data sets to improve generalizability. Ongoing and future work include measuring the EZ loss changes longitudinally to monitor disease progression and correlating these structural measurements with the outcomes in functional tests to further streamline criteria for early and definitive diagnosis of toxicity.

Clinical translation of this tool would enable automated and objective identification of patients who demonstrate changes concerning for toxicity which could aid the screening ophthalmologist. Corroborating these results with ancillary functional testing and/or identifying patients who would benefit from referral to specialists would improve current screening methods. Implementation of this automatic algorithm could also help the feasibility of screening outside of ophthalmology offices as OCTs become more ubiquitous in internal medicine settings. Quantitative data produced from the algorithms could provide surrogate endpoints for use in clinical trials and interventional studies aimed at halting progression of degenerative changes. Furthermore, this tool could directly translate to other diseases affecting the outer retina that share structural features of loss of EZ reflectivity band and could provide useful outcome measures in developing any therapeutics that may alter the course of the disease.

Computing System

Figure 9:
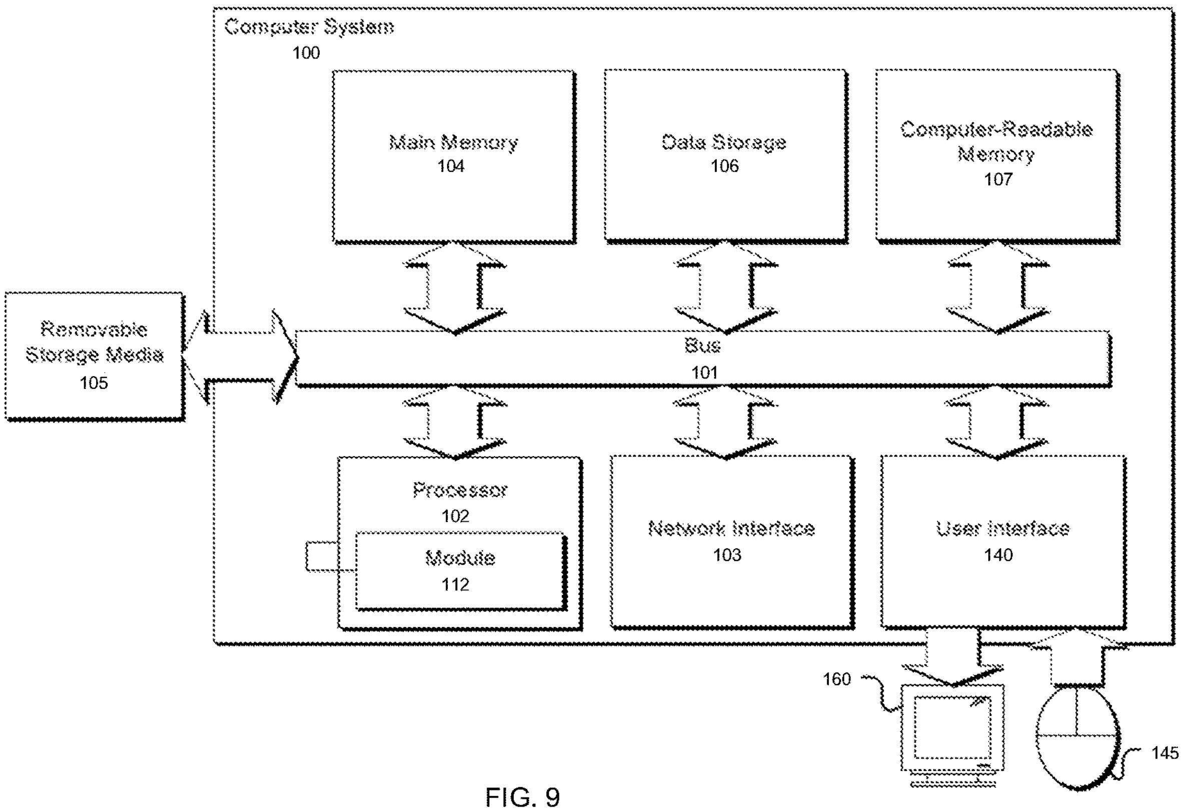
FIG. 9 is a simplified block diagram showing an exemplary computer system for effectuating the functionalities of the present system and method.

FIG. 9 illustrates an example of a suitable computing system 100 used to implement various aspects of the present system and methods for automatically detecting hydroxychloroquine-induced retinal toxicity in SD-OCT imagers. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 112. Such modules 112 are hardware-implemented, and thus include at least one tangible unit capable of performing certain operations and may be configured or arranged in a certain manner. For example, a hardware-implemented module 112 may comprise dedicated circuitry that is permanently configured (e.g., as a special-purpose processor, such as a field-programmable gate array (FPGA) or an application-specific integrated circuit (ASIC)) to perform certain operations. A hardware-implemented module 112 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 112 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 112 are temporarily configured (e.g., programmed), each of the hardware-implemented modules 112 need not be configured or instantiated at any one instance in time. For example, where the hardware-implemented modules 112 comprise a general-purpose processor configured using software, the general-purpose processor may be configured as respective different hardware-implemented modules 112 at different times. Software may accordingly configure a processor 102, for example, to constitute a particular hardware-implemented module at one instance of time and to constitute a different hardware-implemented module 112 at a different instance of time.

Hardware-implemented modules 112 may provide information to, and/or receive information from, other hardware-implemented modules 112. Accordingly, the described hardware-implemented modules 112 may be regarded as being communicatively coupled. Where multiple of such hardware-implemented modules 112 exist contemporaneously, communications may be achieved through signal transmission (e.g., over appropriate circuits and buses) that connect the hardware-implemented modules. In embodiments in which multiple hardware-implemented modules 112 are configured or instantiated at different times, communications between such hardware-implemented modules may be achieved, for example, through the storage and retrieval of information in memory structures to which the multiple hardware-implemented modules 112 have access. For example, one hardware-implemented module 112 may perform an operation, and may store the output of that operation in a memory device to which it is communicatively coupled. A further hardware-implemented module 112 may then, at a later time, access the memory device to retrieve and process the stored output. Hardware-implemented modules 112 may also initiate communications with input or output devices.

As illustrated, the computing system 100 may be a general purpose computing device, although it is contemplated that the computing system 100 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general-purpose computing device may include various hardware components, such as a processor 102, a main memory 104 (e.g., a system memory), and a system bus 101 that couples various system components of the general-purpose computing device to the processor 102. The system bus 101 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 100 may further include a variety of computer-readable media 107 that includes removable/non-removable media and volatile/nonvolatile media, but excludes transitory propagated signals. Computer-readable media 107 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 104 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 102. For example, in one embodiment, data storage 106 holds an operating system, application programs, and other program modules and program data.

Data storage 106 may also include other removable/non-removable, volatile/nonvolatile computer storage media. For example, data storage 106 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 100.

A user may enter commands and information through a user interface 140 or other input devices 145 such as a tablet, electronic digitizer, a microphone, keyboard, and/or pointing device, commonly referred to as mouse, trackball or touch pad. Other input devices 145 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 145 are often connected to the processor 102 through a user interface 140 that is coupled to the system bus 101, but may be connected by other interface and bus structures, such as a parallel port, game port or a universal serial bus (USB). A monitor 160 or other type of display device is also connected to the system bus 101 via user interface 140, such as a video interface. The monitor 160 may also be integrated with a touch-screen panel or the like.

The general-purpose computing device may operate in a networked or cloud-computing environment using logical connections of a network interface 103 to one or more remote devices, such as a remote computer. The remote computer may be a personal computer, a server, a router, a network PC, a peer device or other common network node, and typically includes many or all of the elements described above relative to the general-purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general-purpose computing device may be connected to a public and/or private network through the network interface 103. In such embodiments, a modem or other means for establishing communications over the network is connected to the system bus 101 via the network interface 103 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

Testing

Figure 10:
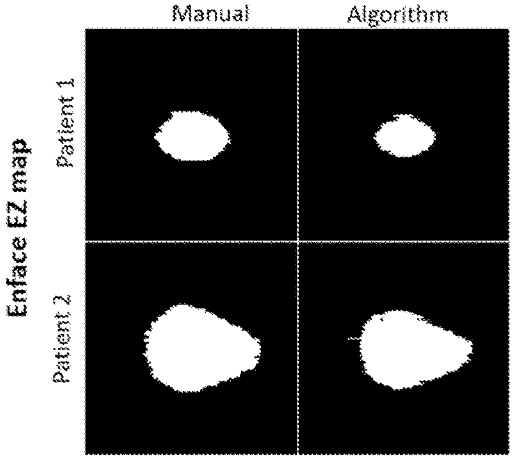
FIG. 10 shows respective graphical representations of RP performance data for an algorithm trained using HCQ patients to detect EZ loss.
Figure 10:
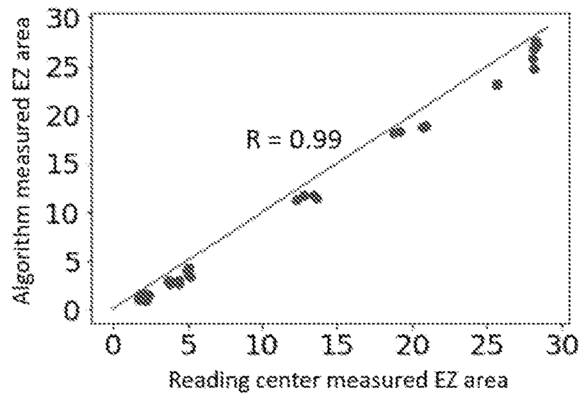

FIG. 10 provides retinitis pigmentosa (RP) performance validation data of the algorithm in detecting and quantifying EZ loss in OCT images of patients with retinitis pigmentosa in comparison with manual ground truth estimation by a reading center. The enface EZ loss map compares images of two patients based on manual evaluation as compared to an evaluation performed by the algorithm. As shown in the graphical representation, the algorithm measured EZ loss vs. reading center measured EZ loss generated a value of R=0.99. In the manual evaluation, the total area (A1) measured was 10.52±9.88 $mm^2$, while the total area (A2) measured by the algorithm was 9.32±9.55 $mm^2$. The area difference (|A1−A2|) was determined to be 1.20±0.67 $mm^2$.

Figure 11:
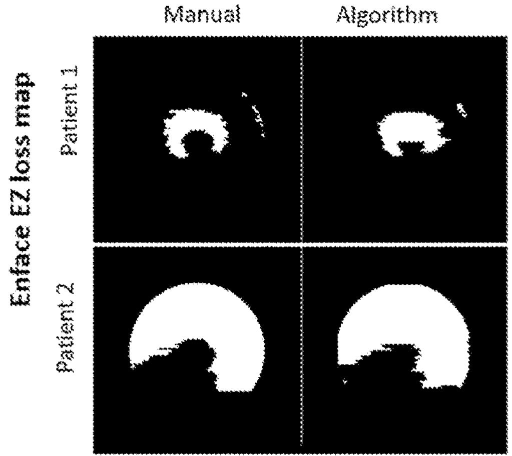
FIG. 11 shows respective graphical representations of HCQ performance validation for data acquired with Cirrus SD-OCT imaging device after additional training with manual ground truth for 13 pairs of eyes of patients.
Figure 11:
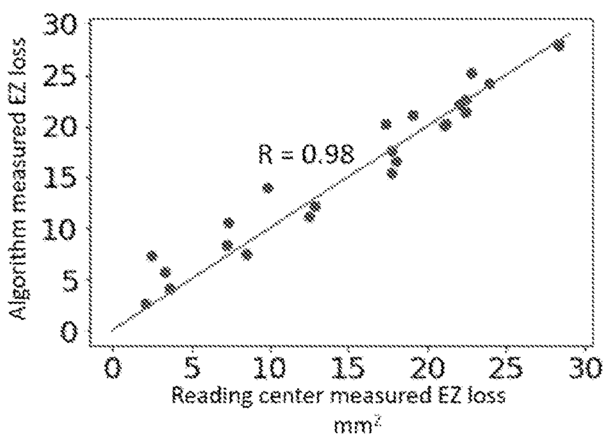

FIG. 11 provides the results of an algorithm as a decision support tool in patients with hydroxychloroquine induced retinopathy based on Cirrus SD-OCT imaging. Specifically, the algorithm was trained using manual ground truth based on 13 pairs of eyes from tested patients with Cirrus SD-OCT imaging. The enface EZ loss map compares images of two patients based on manual evaluation as compared to an evaluation performed by the algorithm. As shown in the graphical representation, the algorithm measured EZ loss vs. reading center measured EZ loss generated a value of R=0.98. In the manual evaluation, the total area (A1) measured was 16.90±8.58 $mm^2$, while the total area (A2) measured by the algorithm was 17.41±7.95 $mm^2$. The area difference (|A1−A2|) was determined to be 1.32±1.26 $mm^2$.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for automatically detecting EZ loss in imaging comprising:

a processor in operative communication with a memory, wherein the memory includes instructions and wherein the instructions which, when executed, cause the processor to:

obtain a plurality of B-scans from a spectral domain optical coherence tomography (SD-OCT) volume;

apply an algorithm by the processor for performing scan-by-scan ellipsoid zone (EZ) loss detections on each B-scan of the plurality of B-scans; and implement a dual-path convolutional neural network combining horizontal and vertical EZ loss projections to predict EZ loss.

2. The system of claim 1, wherein performing EZ loss detection comprises automatically generating an EZ loss segment for each of the plurality of B-scans.

3. The system of claim 2, wherein EZ loss occurs in retinal diseases.

4. The system of claim 3, wherein the retinal diseases comprise hydroxychloroquine-induced retinal toxicity or retinitis pigmentosa.

5. The system of claim 1, further comprising:

projecting scan-by-scan EZ loss detections onto an enface EZ loss map to estimate a two-dimensional (2D) enface EZ loss projection representing regions of EZ loss in the SD-OCT volume.

6. The system of claim 5, wherein estimating the 2D enface EZ loss projection comprises applying a dual path neural network that generates a horizontal 2D EZ loss projection and a vertical 2D EZ loss projection, wherein the horizontal 2D EZ loss projection is based on horizontally sampled scans obtained from the SD-OCT volume and the vertical 2D EZ loss projection is based on vertically sampled scans obtained from the SD-OCT volume.

7. The system of claim 6, further comprising:

training in parallel a horizontal neural network of the dual path network and a vertical neural network of the dual path network such that the horizontal neural network is trained using the horizontally sampled scans aligned along a horizontal orientation and the vertical neural network is trained using the vertically sampled scans aligned along a vertical orientation of the SD-OCT volume.

8. The system of claim 7, wherein the trained horizontal neural network generates a horizontal 2D EZ loss projection and the trained vertical neural network generates a vertical 2D EZ loss projection.

9. The system of claim 8, wherein the horizontal 2D EZ loss projection and the vertical 2D EZ loss projection are combined using a combined projection network (CPN) to generate the enface EZ loss map.

10. The system of claim 8, wherein the CPN generates an estimate for the presence of EZ loss at each location in the enface EZ loss map.

11. A method for automatically detecting EZ loss in imaging comprising:

obtaining a plurality of horizontally sampled scans and a plurality of vertically sampled scans from an SD-OCT volume;

training in parallel a horizontal neural network and a vertical neural network such that the horizontal neural network is trained using the plurality of horizontally sampled scans aligned along a horizontal orientation and the vertical neural network is trained using the plurality of vertically sampled scans aligned along a vertical orientation of the SD-OCT volume;

generating a horizontal 2D EZ loss projection by the horizontal neural network and a vertical 2D EZ loss projection by the vertical neural network; and combining the horizontal 2D EZ loss projection and the vertical 2D EZ loss projection using a combined projection network (CPN) to generate an enface EZ loss map.

12. The method of claim 11, wherein the CPN generates an estimate for the presence of EZ loss at each location in the enface EZ loss map.

* * * * *